United States Patent
Inoue et al.

(10) Patent No.: US 8,371,736 B2
(45) Date of Patent: Feb. 12, 2013

(54) BIFURCATED LINEAR LIGHT SOURCE APPARATUS

(75) Inventors: Masaki Inoue, Hyogo (JP); Yutaka Shiozaki, Hyogo (JP); Hiroshige Hata, Hyogo (JP); Kiyoyuki Kabuki, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 238 days.

(21) Appl. No.: 12/805,826

(22) Filed: Aug. 20, 2010

(65) Prior Publication Data
US 2011/0044059 A1 Feb. 24, 2011

(30) Foreign Application Priority Data
Aug. 21, 2009 (JP) ................. 2009-191795

(51) Int. Cl.
*F21V 7/04* (2006.01)
*F21V 7/06* (2006.01)

(52) U.S. Cl. ................. 362/610; 362/311.06; 362/335; 362/551; 362/623; 358/484

(58) Field of Classification Search .............. 362/551, 362/554, 31, 243, 335, 347, 311.06, 311.07, 362/610, 623, 625; 358/474, 484
See application file for complete search history.

(56) References Cited

U.S. PATENT DOCUMENTS

| 7,953,312 B2 * | 5/2011 | Kabuki et al. ............. 385/146 |
| 2009/0003784 A1 | 1/2009 | Kabuki et al. |
| 2009/0010020 A1 * | 1/2009 | Katsumata et al. ......... 362/554 |
| 2009/0310190 A1 * | 12/2009 | Ikeda ............................. 358/474 |

FOREIGN PATENT DOCUMENTS

| JP | 2005-229647 A | 8/2005 |
| JP | 2008-216409 A | 9/2008 |

* cited by examiner

*Primary Examiner* — Karabi Guharay
(74) *Attorney, Agent, or Firm* — Rader, Fishman & Grauer PLLC

(57) ABSTRACT

A light source apparatus includes first and second light direction changing faces that extend in a longitudinal direction, a light guiding member having first and second light emitting faces that are formed to respectively face the first and second light direction changing faces and a light source that is arranged on one end face of the light guiding member. A first vertical plane extending in a longitudinal direction with respect to the first light direction changing face and a second vertical plane extending in a longitudinal direction with respect to the second light direction changing face intersect. A groove which extends in a longitudinal direction of the light guiding member is formed between the first and second light direction changing faces. A surface forming the groove may be parabolic in a cross section.

3 Claims, 4 Drawing Sheets

FIG.7
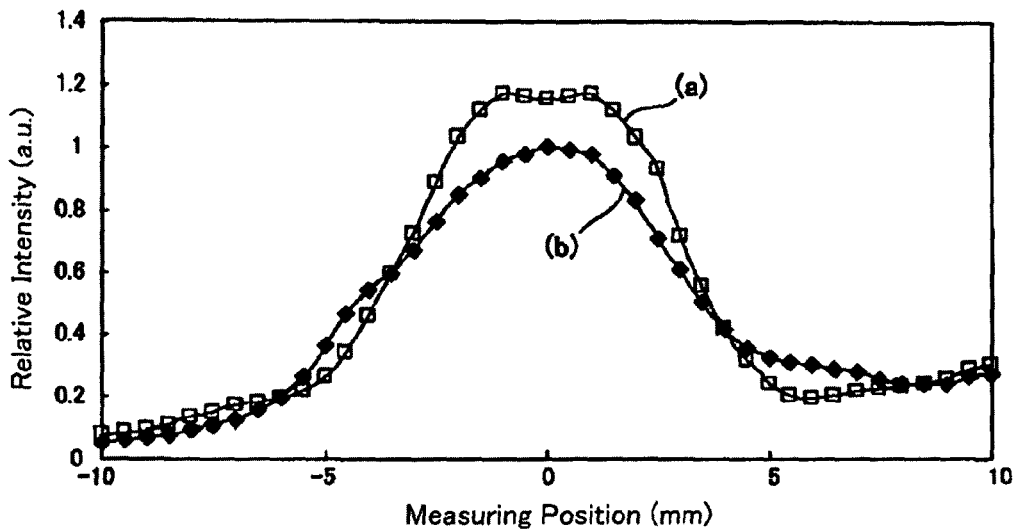
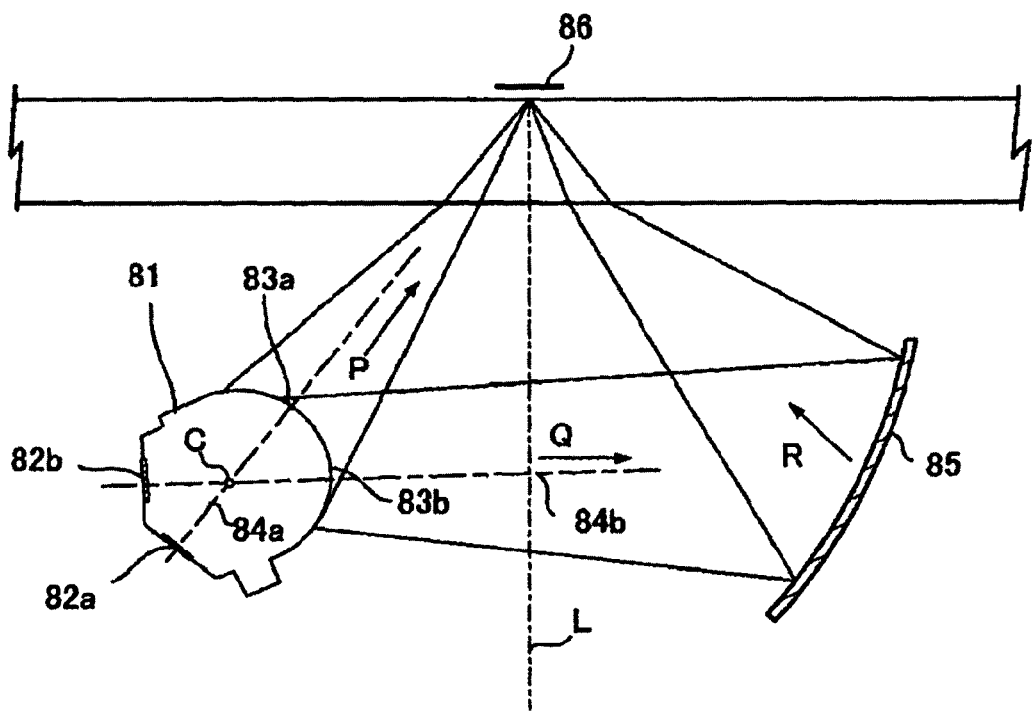
FIG.8
Related Art

BIFURCATED LINEAR LIGHT SOURCE APPARATUS

CROSS-REFERENCES TO RELATED APPLICATION

This application claims priority from Japanese Patent Application Serial No. 2009-191795 filed Aug. 21, 2009, the contents of which are incorporated herein by reference in their entirety.

TECHNICAL FIELD

The present invention relates to a light source apparatus used as an illumination light source of an image reading apparatus such as a facsimile, a copying machine, an image scanner, a bar code reader, etc., and especially, relates to a light source apparatus which is configured as a bifurcated linear light source apparatus.

BACKGROUND

In recent years, in an image reading apparatus, such as a personal facsimile, small size and low power consumption light emitting diodes (hereinafter referred to as LEDs) are used as a light source of a reading light source apparatus, since an output of such LEDs and in the sensitivity of a CCD type sensor as a light receiving element have been improved. In a linear light source apparatus, which is equipped with such LEDs as light sources, a linear light source is formed by using a light guiding member, in order to decrease the number of the light sources and to obtain uniform illumination intensity. In particular, light emitted from the light source enters the light guiding member so that the light is led towards a desired direction.

Japanese Patent Application Publication No. 2005-229647 discloses a lighting unit having two light source apparatuses, to each of which a light source is attached at an end portion in a longitudinal direction of a light guiding member, and these two light source apparatuses are arranged to face each other. The light guiding member is made of a resin having high light transmission nature such as acrylic and polycarbonate, or of an optical glass having high light transmission nature, and has a light emitting face at one side portion extending in a longitudinal direction. One or more LEDs are attached as the light source, wherein light that enters the one end face of the light guiding member from the LED is led in a longitudinal direction inside the light guiding member by reflection. At the same time, the light reflected on a light direction changing face, which is formed of a prism face, is emitted from a light emitting face. Each lighting source apparatus is arranged so that a document reading face of a document is irradiated with light that is emitted from each light emitting face, that is, each of them irradiates the same document reading face area. Accordingly, since the document reading face is irradiated with the light from two directions, a shadow is not created even if there are uneven portions formed by folded lines or paper pasting and a good image reading is obtained.

However, in this lighting unit, two light source apparatuses are needed in order to illuminate one irradiation surface. Further, since the light guiding member arranged in a light source apparatus is basically the same shape, the two light source apparatuses are arranged in a state where they are apart from each other at a predetermined distance, so that light directions may become symmetrical. As a result, the entire lighting unit becomes large in size.

In view of the above, described below is a light guiding member and a bifurcated linear light source apparatus, capable of irradiating a document reading face with light from two directions thereof, and capable of realizing the miniaturization of the lighting unit. Japanese Patent Application Publication No. 2008-216409 teaches the technology.

FIG. 8 is an explanatory cross sectional view of the fundamental structure of a light source apparatus according to Japanese Patent Application Publication No. 2008-216409. A light guiding member 81 is formed in a shape of rod whose body is φ5-φ6, and whose full length is 320 mm, and has light direction changing faces 82a and 82b that are formed of two prisms on side faces that extending in a longitudinal direction thereof, and corresponding to a bottom portion. The light guiding member 81 has light emitting faces 83a and 83b which are formed on a common curved surface, right above a traveling direction of the light emitted from the light direction changing faces 82a and 82b. As shown in FIG. 8, the two light direction changing faces 82a and 82b are formed so that the directions, in which the light advances, may intersect, that is, configured so that a line segment 84a, which connects the center of one light direction changing face 82a and a center of light emitting face 83a to each other, intersects with a line segment 84b that connects the center of the other side reflective surface 82b and the center of the other side light emitting face 83b to each other. A light source comprising, for example, light emitting diodes (LED), is located in one end surface of the light guiding member 81 and at an exact point where the line segments 84a and 84b intersect, and is configured so that when light emitted from the light source enters the end surface of the light guiding member 81, the light is led in a length direction, and efficiently enters the light direction changing faces 82a and 82b.

In the example of the figure, the light reflected on the light direction changing face 82a is transmitted inside the light guiding member 81 so as to be emitted from the light emitting face 83a, and emitted in a direction shown by an arrow P, whereby a document reading face, that is, an irradiation area 86 is irradiated with the light. And the light reflected on the light direction changing face 82b is transmitted inside the light guiding member 81, so as to be emitted from the light emitting face 83b, whereby the light is emitted in a direction shown by an arrow Q.

And a reflective mirror 85 is arranged to face the light guiding member 81, and the light in the direction shown by the arrow Q is directed in a direction shown by an arrow R, so that an irradiation surface is irradiated with the light from two directions (the direction of P, the direction of R) symmetrically with respect to an axis L that passes through the irradiation surface. Therefore, even one light source apparatus can irradiate the light irradiation face 86 from the two directions with the light. As a result, while it is possible to attain highly precise image scanning, it is possible to realize the miniaturization of the lighting unit.

SUMMARY

In view of the above, a light source apparatus according to the present invention includes a first light direction changing face and a second light direction changing face, which respectively extend in a longitudinal direction, a light guiding member having a first light emitting face and a second light emitting face, which are formed to respectively face the first and second light direction changing faces, a light source that is arranged on at least one end face of the light guiding member. In the light guiding member, a first vertical plane extends in the longitudinal direction with respect to the first light direction changing face and a second vertical plane extends in the longitudinal direction with respect to the second light direction changing face and these planes intersect in a light emitting face side from the first and second light direction changing faces respectively. Further, a groove extends in the longitudinal direction of the light guiding member is formed between the first light direction changing face and the second light direction changing face.

Moreover, in the light guiding member according to the present invention, a face on which the groove is formed may be parabolic in a cross section thereof, and the light guiding member maybe a transparent rod shape cylindrical light guiding member. Further, since the groove, which extends in the longitudinal direction of the light guiding member, is formed between the first and the second light direction changing faces so that light, which reaches a side face portion that forms the groove, can be reflected to the light emitting face, more light may be emitted from the light emitting face.

Furthermore, since the side face, which forms the groove, is parabolic in a cross-sectional view thereof, the light that reaches the side face thereof can be directed so as to travel perpendicularly to the light direction changing face, so that the cross-sectional intensity distribution at a peak in the light emitting face can be made flat.

BRIEF DESCRIPTION OF THE DRAWINGS

Other features and advantages of the present light source apparatus will be apparent from the ensuing description, taken in conjunction with the accompanying drawings, in which:

FIG. 7 is a diagram of an example of a cross-sectional intensity distribution according to an embodiment and a comparative example;

FIG. 8 is an explanatory diagram of a bifurcated linear light source apparatus according to a related technology, and is an explanatory diagram of an optical path in case where the light source apparatus is equipped with a document reading lighting apparatus.

DESCRIPTION

In the above mentioned light source apparatus, since only one light guiding member is provided, the number of the LEDs is relatively small. For this reason, there is a problem of insufficient light intensity.

In the case of the light guiding member 81 shown in FIG. 8, light components with a large angle among light components which travel in directions of the vertical lines 84a and 84b from the light direction changing faces 82a and 82b are blocked by a base material of the light source apparatus creating a problem in which light cannot be effectively emitted from the light emitting faces 83a and 83b.

It is possible to solve the problem by simply raising an input electric power applied to the light source (LED) in order to compensate the shortage of the light intensity. However, when the electric power is simply increased, the light source (LED) heats up and the light guiding member is overheated beyond the upper temperature limit, degradation of the light source accelerates, or luminous efficacy of the light source deteriorates. Thus, raising the input electric power is a sufficient solution.

Moreover, in the light source apparatus of the prior art, since it is configured so that light is emitted from the light emitting faces 83a and 83b, the highest illuminance is obtained in an efficient center portion. As a result, a cross-sectional intensity distribution near a peak of the light intensity is shown as a shape of a projection. While it is possible to efficiently condense light at such peak, when the light source apparatus is built in a real machine for document reading, and the peak of illuminance shifts even slightly from an irradiated field, there is a problem in which it becomes extremely dark.

It is a first object of the present invention to offer a light source apparatus capable of emitting light in two directions from one light guiding member, of improving the efficiency of taking out light, and of further increasing an optical output in the light source apparatus. And it is a second object of the present invention to offer a light source apparatus, in which a cross-sectional intensity distribution near a peak of light intensity is flat and a tolerance range is large in the accuracy of position at time when it is installed in an actual apparatus so that it is easy to equip such an actual apparatus with the light source apparatus.

Figure 1:
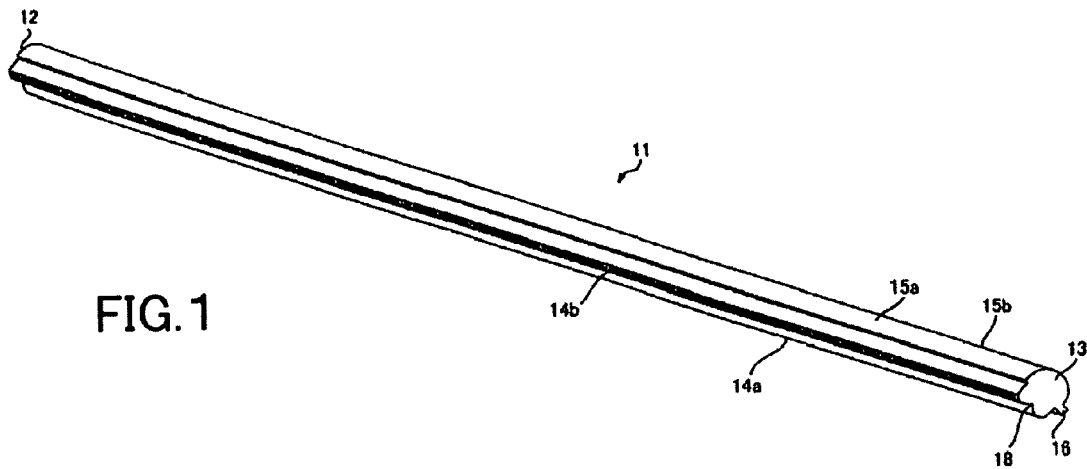
FIG. 1 is an explanatory perspective view of a light guiding member according to a first embodiment of the present invention.
Figure 2:
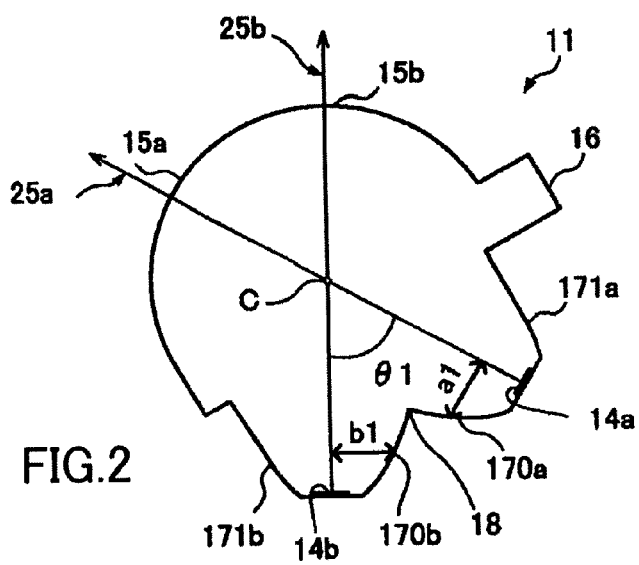
FIG. 2 is a projection drawing of a light guiding member according to a first embodiment of the present invention.
Figure 3:
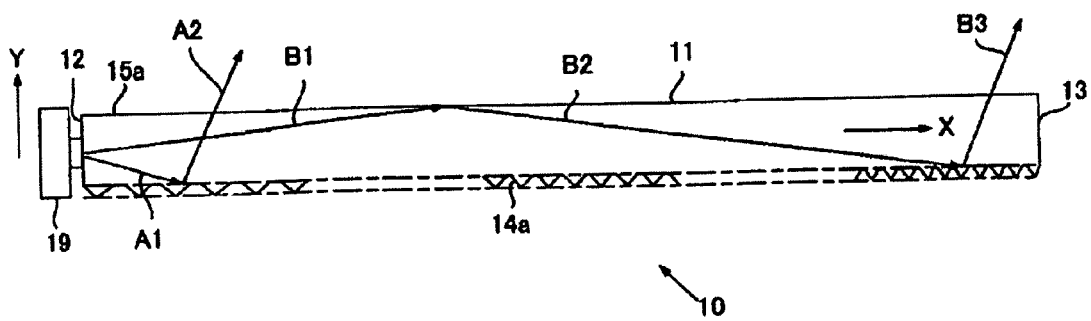
FIG. 3 is an explanatory diagram of a light source apparatus according to another embodiment of the present invention, which is viewed from a cross direction thereof.

An embodiment according to the present invention will be described below, referring to FIGS. 1 to 5. FIG. 1 is an explanatory perspective view of a light guiding member with which a light source apparatus is equipped according to this embodiment. FIG. 2 is a projection figure of the light guiding member shown in FIG. 1, which is viewed from one end face thereof in a longitudinal direction. FIG. 3 is a cross sectional view of a light source apparatus according to the present embodiment, taken along a vertical plane extending in a longitudinal direction from the center of a first light direction changing face of a light guiding member shown in FIG. 1. In FIG. 1, a light guiding member 11 is made of transparent acrylic resin and is formed in a rod shape. For example, a radius of the light guiding member 11 is $\phi 5$-$\phi 6$, and the full length thereof is 320 mm. An optical incidence face 12 is formed on at least one of end faces of the light guiding member 11 in a longitudinal direction, and the first light direction changing face 14a and a second light direction changing face 14b are formed next to each other across a groove 18, on a side face portion the light guiding member 11 extending in the longitudinal direction thereof (which is shown in the near side of FIG. 1). Moreover, in side portions that are respectively opposite to the first and second light direction changing faces 14a and 14b, a light emitting face 15a is formed so as to face the first light direction changing face 14a, and a light emitting face 15b is formed so as to face the second light direction changing face 14b. In this embodiment, the light emitting faces 15a and 15b are formed on a face common to each other, the face having an approximately semicircle shape in a cross sectional view thereof. In addition, a projection portion 16 is provided between the light direction changing face 14a and the light emitting face 15b of the light guiding member 11, in order that the light guiding member 11 is easily and certainly fixed to and held by a base material of a lighting unit.

In the projection drawing of FIG. 2, the first light direction changing face 14a and the second light direction changing face 14b are respectively shown as line segments 14a and 14b. In the projection drawing, a line which is perpendicular to the first light direction changing face 14a, and which extends toward the light emitting face 15a from the center of the first light direction changing face 14a, is represented as a first vertical line 25a. Similarly, in the projection drawing, a line that is perpendicular to the second light direction changing face 14b shown as a line segment and that extends toward the light emitting face 15b from the center of the second light direction changing face 14b, is represented as a second vertical line 25b. These two vertical lines, that is, the first vertical line 25a and the second vertical line 25b, intersect with each other, forming an intersecting angle θ1 (θ1≦90). In other words, the first light direction changing face 14a and the second light direction changing face 14b are formed so that the vertical plane with respect to the first light direction changing face 14a that extends in a longitudinal direction of the light guiding member 11 and the vertical plane with respect to the second light direction changing face 14b that extends in the longitudinal direction, may intersect with each other in a side of a light emitting direction, which is a light traveling direction.

Between the first light direction changing face 14a and the light direction changing face 14b in the light guiding member 11, the groove 18 is formed so as to extend in the longitudinal direction of the light guiding member 11. By forming the groove 18, side faces 170a and 170b are formed between the first light direction changing face 14a and the second light direction changing face 14b. Here, the side face 170a, which is formed so as to be adjacent to the first light direction changing face 14a, is formed so as to be further away from the vertical line 25a in a direction from the first light direction changing face 14a to the light emitting face 15a, that is, it is formed so that a width a1 gradually increases. Furthermore, the side face 170b, which is formed so as to be adjacent to the first light direction changing face 14b, is formed so as to be further away from the vertical line 25b in a direction from the first light direction changing face 14b to the light emitting face 15b, that is, it is formed so that width b1 gradually increases.

Since reflective surfaces are formed on the surfaces of the specific side faces 170a and 170b, which are formed by forming the groove 18 between the first light direction changing face 14a and the second light direction changing face 14b, when light is reflected towards the specific side faces 170a and 170b from the first light direction changing faces 14a or the second light direction changing face 14b, the light is reflected on the specific side face 170a or 170b, so that the light can be emitted towards the light emitting face 15a or 15b.

These specific side faces 170a and 170b may have any surface shape(s), such as a flat surface, a curved surface whose cross section is a circle or an ellipse, or a curved surface whose cross section is a parabola, or these surfaces may be combined with each other to form the side faces 170a and 170b. In the cross sectional view of the light guiding member 11, the side faces 170a and 170b preferably are respectively formed to have a parabola curved surface which has a focal point on the vertical line 25a or 25b.

Furthermore, in the first light direction changing face 14a and the second light direction changing face 14b, each of the side faces 171a and 171b, which are formed in opposite sides of the groove 18, preferably have a parabolic shape wherein a light component is reflected in a direction parallel to the direction of the first vertical line 25a or the second vertical line 25b. Thus, since the specific side face, which is formed along with the first light direction changing face 14a or the second light direction changing face 14b, has such a parabolic curved face in across sectional view, light having components that are parallel to the first vertical line 25a or the second vertical line 25b can be emitted (near a peak of the light intensity in each light emitting face) so that a peak of a cross sectional light intensity distribution can be approximately made flat.

As understood from the cross sectional shape of the first light direction changing face of FIG. 3, the first light direction changing face 14a and the second light direction changing face 14b respectively have a convex and concave groove portion that consists of a large number of concavities and convexities formed in parallel to one another in the longitudinal direction thereof, and the single first light direction changing face 14a and the single second light direction changing face 14b are respectively formed on one flat surface. Concrete numerical values thereof are shown below. The length in a direction of a short side of the first light direction changing face 14a and the second light direction changing face 14b is 0.5 to 0.2 mm. For example, the first light direction changing face 14a and the second light direction changing face 14b are formed in the shape of a plane having a 1 mm width, and are formed so that an intersecting angle θ1 is 45-65 degrees, for example, 55 degrees. Furthermore, the first light direction changing face 14a and the second light direction changing face 14b are configured so that the first vertical line 25a and the second vertical line 25b may intersect with each other at the curvature center line of the semicircle of the light emitting faces 15a and 15b of the light guiding member 11. Thereby, the convergency of light, which is emitted from the light emitting faces 15a and 15b, is improved.

As mentioned above, since the large number of slots that consist of concavities and convexities are formed in parallel to one another in the longitudinal direction on the first light direction changing face 14a and the second light direction changing face 14b, for example, light that enters the light guiding member 11 from the optical incidence face 12, is efficiently guided in the longitudinal direction of the light guiding member 11, i.e., a direction towards the other end face 13 direction, while repeating total reflection within the light guiding member 11. The directions of the light having light components with an angle, which are guided in the longitudinal direction, are changed to directions of the light emitting face 15a and the light emitting face 15b (a direction of approximately 90 degree thereto) by the first light direction changing face 14a and the second light direction changing face 14b, so that the light is emitted from the light emitting face 15a and the light emitting face 15b according to the Snell's law.

A light source 19, which, for example, is made up of LED(s), is arranged in a direction in which light is emitted therefrom towards the light incidence section 12 formed in the one end in the longitudinal direction of the light guiding member 11. The light source 19 and the light guiding member 11 are provided so as to be apart from each other at a very close distance. The light emitted from the light source 19 is emitted into the atmosphere, and then enters the inside of the light guiding member 11. As described above referring to FIG. 2, the position of the light source 19 is arranged at a point C at which the vertical lines 25a and 25b of the first light direction changing face 14a and the second light direction changing face 14b intersect each other. And by arranging the light source at a position which corresponds to a point on the vertical lines with respect to the light direction changing faces 14a and 14b, direct light that enters the light direction changing faces 14a and 14b increases, and it is possible to improve the light emitting efficiency.

Description of an optical path in a longitudinal direction will be given below referring to FIG. 3. Light that enters the light guiding member 11 from the light source 19 is totally reflected (total reflection) in the inside of the light guiding member 11, and the light is guided in the longitudinal direction X. In the process of guiding light therein, the direction of the light that enters the inclining face of the concave and convex groove of the light direction changing face 14a is changed to a short side direction Y (width direction) of the light guiding member 11, so as to be emitted from the light emitting face 15a. Since the angle of the inclining face of the concave and convex groove of the light direction changing face 14a, which consists of concavities and convexities, is adjusted so that the light A1 from the light source 19 becomes light A2 that is emitted approximately perpendicularly to the light emitting face 15a, the light A1, which enters the inclining face of the convex and concave groove of the light direction changing face 14a, turns into the light A2 that propagates in the width direction Y of the light guiding member 11 towards the light emitting face 15a from the light direction changing face 14a. Moreover, the light B1, which enters the light emitting face 15a from the light source 19, is totally reflected on the light emitting face 15a, and becomes light B2, which propagates in the longitudinal direction X, while maintaining an incident angle. Then, the reflected light B2 enters the inclining face of the convex and concave groove of the light direction changing face 14a, and becomes light B3, which propagates in the short side (width) direction Y of the light guiding member 11 toward the light emitting face 15a from the light direction changing face 14a.

Figure 4:
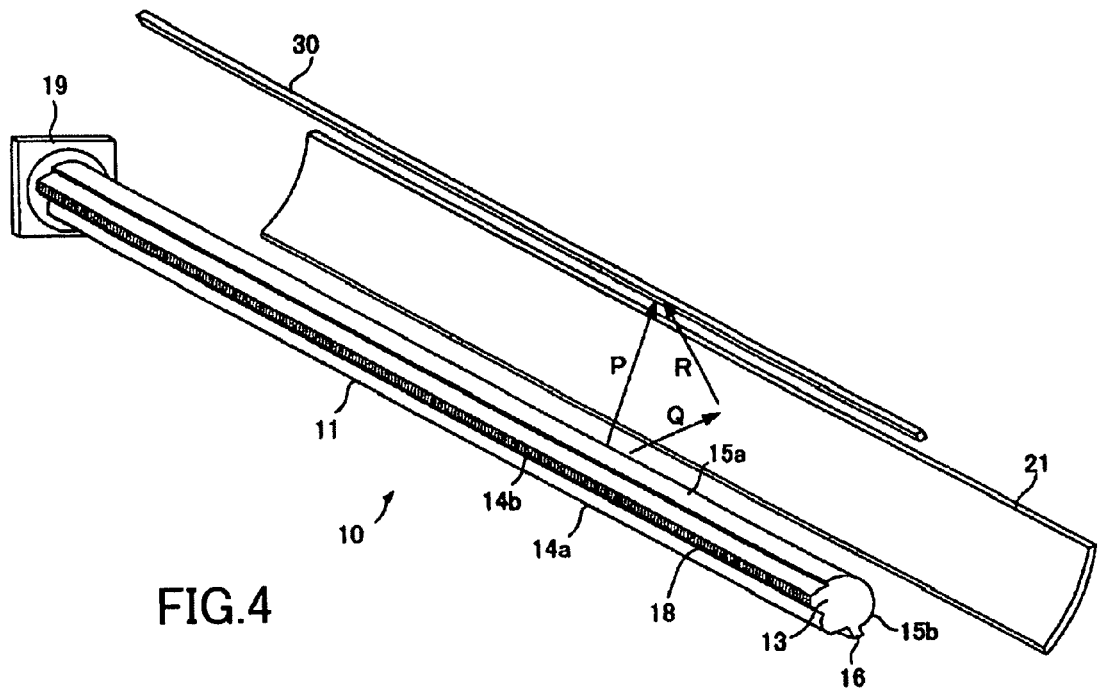
FIG. 4 is an explanatory perspective view in case where a light source apparatus is equipped with a document reading lighting apparatus according to another embodiment of the present invention.
Figure 5:
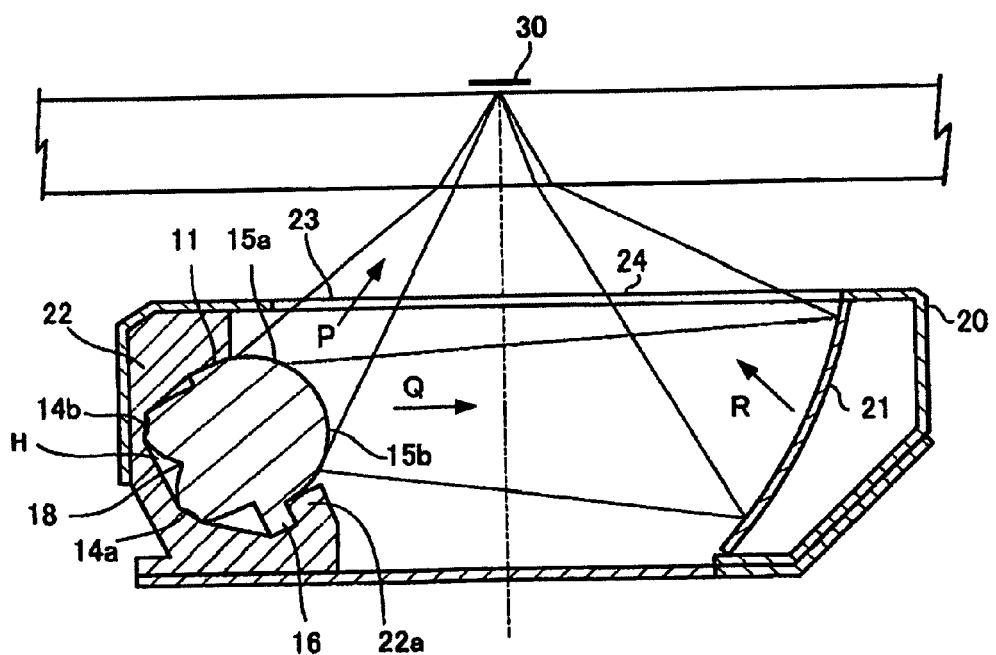
FIG. 5 is an explanatory cross sectional view in case where a light source apparatus is equipped with a document reading lighting apparatus according to another embodiment of the present invention.

As shown in FIG. 3, intervals between the peaks of the convex and concave grooves of the light direction changing face 14a, become wider when closer to the light source 19 and become narrower when further from the light source 19. That is, the intervals between the peaks of the convex and concave grooves of the light direction changing face 14a are adjusted so as to be narrower as they are further away from the light source 19. Thus, by the above configuration, a probability that the light, which enters the light guiding member 11 from the light source 19, is changed in direction, can be adjusted to be constant or arbitrarily adjusted, so that desired illuminance distribution can be obtained. Moreover, although not shown, a film of aluminum is formed on an outer face of a portion where the light direction changing face 14a of the light guiding member 11 is formed. The film of aluminum serves as a reflective film so that the light may not be emitted from the light direction changing face 14a to the outside of the light guiding member 11, whereby the stray light can be prevented while efficiently emitting the light to a side of a work piece to be irradiated. FIG. 4 is a perspective view of part of a bifurcated linear light source apparatus, to which the light guiding member shown in FIGS. 1-3 is applied, and FIG. 5 is a cross sectional view of the bifurcated linear light source apparatus, taken in a short side direction of the light guiding member. An approximately U-shaped holding section 22 is provided on a bottom portion of a case 20, and the light guiding member 11 is mechanically fixed thereto by the holding section 22. A pair of projections 16 is engaged with an engaging claw 22a of the holding section 22, so as not to be rotated. A reflection mirror 21 is provided in an opposite side of the light guiding member 11. The reflection mirror 21 is arranged at a position at which the reflection mirror 21 and the light guiding member 11 are approximately symmetrical with respect to a face perpendicular to the center of the irradiation area 30 on the document reading face.

In FIG. 5, transparent windows 23 and 24 through which light passes are provided in a case 20. Moreover, in the figure, an air layer H is formed between the holding section 22 and the groove 18. The other structural elements correspond to those having the same numerals shown in FIG. 3. The reflection mirror 21 is made up of a gutter-like shape mirror, which has the same length as that of the first light direction changing face 14a and the second light direction changing face 14b in the longitudinal direction. For example, the reflection mirror 21 is made from a bright aluminum plate or a reflection mirror in which a vapor deposited film is formed on a base material surface. The shape thereof is an ellipse or a parabola in a cross sectional view. Thus, by the above configuration, the direction of the light, which is emitted from the light emitting face 15b of the light guiding member 11, can be changed so that the light is guided to the irradiation area 30. In order that the reflection mirror 21 catches almost all the light, which is emitted from the second light emitting face 15b of the light guiding member 11, and reflects it towards the irradiation area 30, the reflection mirror 21 has such a size so as to extend from the upper surface of the case 20 to the bottom face thereof. Further, it is more desirable that the window 24 be formed in a light guiding member 11 side of the case 20 from the reflection mirror 21 so as not to block the reflected light.

As understood from FIG. 3, the light guiding member 11 and the light source 19 are arranged slightly apart from each other so that they do not touch. Since the refractive index of the light guiding member 11 is about 1.5, even if the incident angle of the light, which is incident on the light guiding member 11, is close to 90 degrees, the angle in the inside of the light guiding member after the incidence, exceeds the critical angle (42 degrees) with respect to the side face of the light guiding member 11. Therefore, there is no light, which directly comes out from the side face of the light guiding member 11, so that all the light that enters the light guiding member 11 from the light source 19 is totally reflected. The light, which enters the light guiding member 11, is reflected on the first light direction changing face 14a and the second light direction changing face 14b through the inside of the light guiding member 11, so that the light is emitted as light P and light Q in two directions from the light emitting faces 15a and 15b respectively. The irradiation area 30 is irradiated with direct light P, and the reflected light R, which is the light Q reflected on the reflection mirror 21.

Figure 6:
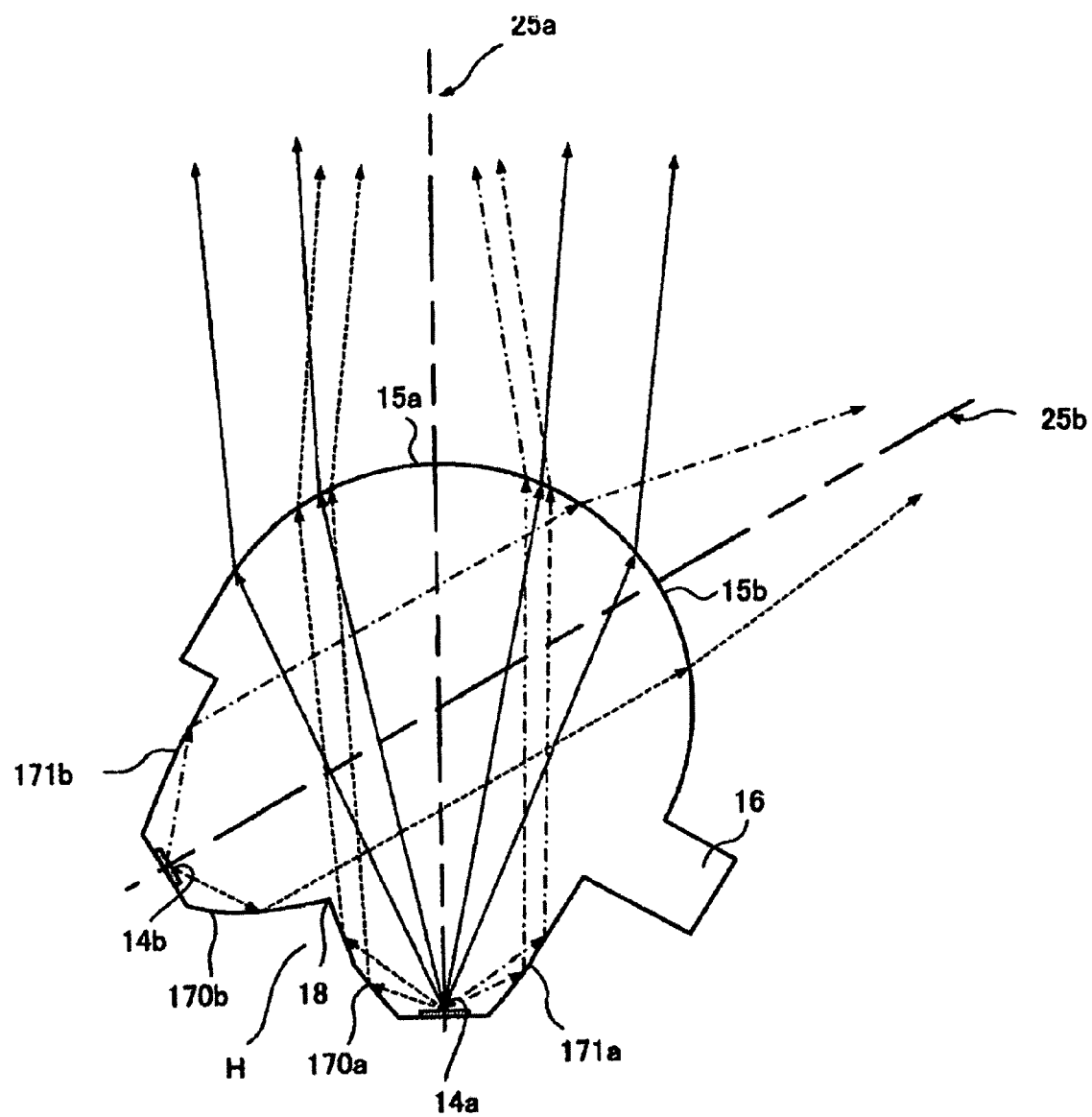
FIG. 6 is an explanatory diagram of an optical path of the inside of a light guiding member according to another embodiment of the present invention.

Description of an optical path in direction of a cross section of the light guiding member of the light source apparatus according to the present invention will be given below referring to FIG. 6. As explained above, the groove 18 is formed between the first light direction changing face 14a and the second light direction changing face 14b in the light guiding member 11, which forms the specific side faces 170a and 170b.

These specific side faces 170a and 170b may have any surface shape(s), such as a flat surface, a curved surface whose cross section is a circle or an ellipse, a curved surface whose cross section is a parabola, or these surfaces may be combined with each other to form the side faces 170a and 170b. Description of the first light direction changing face 14a will be given below as an example. In addition, in the figure, each arrow, which is shown with a solid line, a dashed line, or a dot dash line, is a hypothetical line, which hypothetically shows a path of light entering the light guiding member 11, and refracted by the light direction changing face 14a.

The solid arrows show light components that directly reach the light emitting face 15*a* through the light direction changing face 14*a* and that are emitted from the light guiding member 11. This light flux is most efficiently emitted to the outside among the light components refracted by the light direction changing face 14*a*.

The dashed line arrows show light components that cannot directly enter the light emitting face 15*a*, and which travel toward the adjacent second light direction changing face. These light components reach the specific side face 170*a* portion, which is formed by forming the groove 18 between the light direction changing face 14*a* and the light direction changing face 14*b* of the light guiding member 11. As to this specific side face 170*a*, since the air layer H is provided by forming the groove 18 portion, the light is totally reflected, and since this specific side face 170*a* is formed by, for example, a parabolic-shape curved surface, the light is refracted in a direction parallel to the first vertical line 25*a*, and is emitted from the light emitting face 15*a*. If there is no such an air layer H between the first light change face 14*a* and the second light change face 14*b*, and it is continuously molded with resin, the light, which is not used, enters the second light change face 14*b* or the specific side 171*b* in the other side. However, by forming the groove 18, while the side face 170*a* is formed so as to be further away from the vertical line 25*a* in a direction from the first light direction changing face 14*a* to the light emitting face 15*a*, the air layer H is formed, so that light, which enters the side face 170*a*, can be reflected towards the light emitting face 15*a*, and further the light, which is emitted from the light emitting face, can be increased. Furthermore, the side face 170*b*, which is formed so as to be adjacent to the first light direction changing face 14*b*, is formed so as to be further away from the vertical line 25*b* in a direction from the first light direction changing face 14*b* to the light emitting face 15*b*, that is, it is formed so that a width b1 gradually increases.

Then, description of the dot dash line arrows shown in the figure will be given below. The light flux shown by the dot dash line is also light, which cannot directly reach the first light emitting face 15*a*. These light components reach the side face 171*a* portion in an outside thereof, wherein, as described above, the side face 171*a* is formed so as to face the specific side face 170*a*. This side face 171*a* is formed so as to have a parabolic-shape curved surface. The light components, which reach the specific side face 171*a* are totally reflected on the specific side face 171*a*, and the directions thereof are changed so as to be almost parallel to the vertical line 25*a*, so that the light components are emitted towards the first light emitting face 15*a*. In case where the specific side 171*a* does not have such a parabolic-shape curved surface, since the light has a large angle component with respect to the vertical line 25*a*, the light cannot be emitted from the light emitting face 15*a*, so that the light cannot be effectively used. According to the present invention, since the parabolic-shape curved surface, which has a focal point on the first vertical line 25*a*, is formed, light can be certainly emitted toward the light emitting face.

In a side of the second light direction changing face 14*b*, there is the same structure as that of the specific side faces 170*a* and 171*a* provided on the circumference of the first light direction changing face 14*a*. Since the specific side face 170*b* serves as a reflective surface, even if there is light, which cannot be directly taken out from the direct light emitting face 15*b*, it is possible to certainly reflect the light towards the light emitting face 15*b*, thereby improving the usage efficiency. Furthermore, if the specific side face 171*b* having a parabolic-shape curved face is formed, it become possible to reflect light, which reaches the side face 171*b*, in a direction parallel to the vertical line 25*b*, so that it is possible to further increase an optical output.

The present invention is described above based on the embodiments. The light source apparatus according to the embodiments of the present invention is not limited to the above-mentioned embodiments, and various changes can be made thereto. For example, when the specific side faces, which are continuously connected to the first and second light direction changing faces, are formed so as to have a parabolic-shape curved face, a flat cross sectional light intensity distribution can be acquired at an illuminance peak part. However, the present invention is not limited to this example. These specific side faces may have any surface shape(s), such as a flat surface, a curved surface whose cross section is a circle or an ellipse, a curved surface whose cross section is a parabola, or these surfaces may be combined with each other so as to form the specific side faces. Even in case where such a parabolic-shape curved face is formed, specifically a case where a pseudo parabolic face is formed by using an appropriate curved face and flat face, a flat cross sectional light intensity distribution can be acquired at an illuminance peak part. Although LEDs are described above as an example of the light source, other type of a light source may be used.

Hereafter, although as an embodiment, a document lighting apparatus according to the present invention is explained below, the present invention is not limited thereto.

According to the structure explained referring to FIG. 3, a light source apparatus, which was made up of a light source and a light guiding member, was prepared. A light guiding member (11) was in shape of a rod and was made of transparent polycarbonate. The refractive index thereof was 1.5, a radius thereof was φ5 mm and the full length thereof was 320 mm. First and second vertical lines (25*a*, 25*b*), which were lines respectively drawn from first and second light direction changing faces (14*a*, 14*b*) toward light emitting faces (15*a*, 15*b*), intersect with each other at an angle (A1), which was 55 degrees. By forming a long groove (18) that extended in the length direction for the entire length of the light guiding member (11) between the first light direction changing face (14*a*) and the second light direction changing face (14*b*), while specific side faces (170*a*, 171*a*) are formed so as to be further away from the first vertical line (25*a*) in a light emitting direction (a direction of the first vertical line (25*a*)) from the first light direction changing face (14*a*), the specific side faces (170*b*, 171*b*) are formed so as to be further away from the second vertical line (25*b*) in a light emitting direction (a direction of the second vertical line (25*b*)) from the first light direction changing face (14*b*).

In this embodiment, each of the specific side faces (170*a*, 171*a*) and (170*b*, 171*b*), which was formed in the circumference of the first or second light direction changing face (14*a*, 14*b*), had a parabolic-shape curved surface that was formed at a position close to the first or second light direction changing face (14*a*, 14*b*), and a pseudo parabolic face as a whole was formed by partially forming a flat surface on a portion distant from the first or second light direction changing face (14*a*, 14*b*). A light source (19), which was equipped with LED elements for emitting while light, was arranged at one end face (12) of the light guiding member (11). The light source (19) was located at position where the vertical lines (25*a*, 25*b*) that were drawn from the respective first and second light direction changing faces (14*a*, 14*b*) intersected with each other, and at a position corresponded to the position of the point C shown by FIG. 2.

Comparative Example

A light guiding member (81) having the structure shown by FIG. 8 was produced, using the same material as that in the above-mentioned embodiment 1. However, in the light guiding member (81), a portion between a first light direction changing face (82a) and a second light direction changing face (82b) were continuously formed, so that no groove was formed therebetween. The light source was arranged like the above-mentioned embodiment so that a light source apparatus according the comparative example was produced.

Thus, the light source apparatus according to the embodiment and the comparative example were configured. In each light source apparatus, the cross-sectional luminous intensity distribution of portions that were right above of the first light direction changing faces (14a, 84a) was measured as representative examples. An illuminometer was arranged in a position that was 8 mm from the first light emitting face (15a, 83a), and placed in positions that were ±10 mm in horizontal directions from the position of the first vertical line (25a, 84a), which was set to 0 (zero), in order to measure the illuminance. The result thereof is shown in FIG. 7. FIG. 7 is a graph showing a cross-sectional intensity distribution of light intensity according to the embodiment and the comparative example, wherein a horizontal axis shows a distance (mm) in left and right directions thereof in which the position of the central line of an area to be measured is set to 0 (mm), and a vertical axis shows relative intensity in which the intensity of the illuminance at the position 0 (mm) of the area to be measured according to the comparative example is set to 1. In FIG. 7, (a) shows the relative intensity according to the embodiment, and (b) shows the relative intensity according to the comparative example. As is evident from the result shown in FIG. 7, compared with the light source apparatus according to the comparative example 1, in distribution corresponding to an irradiation area (30, 86) of the light source apparatus according to the embodiment, the illuminance, which was increased by approximately 20% larger than the illuminance in case of the comparative example, was obtained near the center region whose position was 0 mm. Furthermore, according to the embodiment, a portion, in which the relative value was 1 (which is the highest illuminance) or greater, could be extended to ±2 mm or more. Therefore, it was possible to efficiently condense light, which was not used in the prior art, at a portion to be irradiated therewith, so that light intensity could be increased. In addition, it was confirmed that flat luminous intensity distribution could be acquired, near the illuminance peak value.

The preceding description has been presented only to illustrate and describe exemplary embodiments of the present light source apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A light source apparatus comprising:
    a first light direction changing face that extends in a longitudinal direction;
    a second light direction changing face that extends in the longitudinal direction;
    a light guiding member having a first light emitting face and a second light emitting face that are formed so as to respectively face the first and second light direction changing faces; and
    a light source that is arranged on at least one end face of the light guiding member,
    wherein a first vertical plane and a second vertical plane are formed to intersect in a light emitting face side from the first and second light direction changing faces respectively,
    wherein a groove extending in a longitudinal direction of the light guiding member is formed between the first light direction changing face and the second light direction changing face,
    wherein first light direction side faces are formed along both side edges of a first light direction changing face and are configured to emit a light that has a component parallel to the first vertical plane at a peak portion of a light amount at a first light emission face, and
    wherein second light direction side faces are formed along both side edges of a second light direction changing face and are configured to emit a light that has a component parallel to the second vertical plane at a peak portion of a light amount at a second light emission face.

2. The light guiding member according to claim 1, wherein a face on which the groove is formed is parabolic in a cross section thereof.

3. The light guiding member according to claim 1, wherein the light guiding member is a transparent rod shape light guiding member.

* * * * *